Oct. 26, 1954

D. S. MORISHITA 2,692,428

ORANGE PEELER

Filed May 29, 1953

David S. Morishita
INVENTOR.

BY Clarence A. O'Brien
and Harvey B. Jacobson
Attorneys

Oct. 26, 1954  D. S. MORISHITA  2,692,428
ORANGE PEELER
Filed May 29, 1953  2 Sheets-Sheet 2

David S. Morishita
INVENTOR.

Patented Oct. 26, 1954

2,692,428

UNITED STATES PATENT OFFICE 2,692,428

ORANGE PEELER

David S. Morishita, Honolulu, Territory of Hawaii

Application May 29, 1953, Serial No. 358,411

3 Claims. (Cl. 30—24)

This invention relates to new and useful improvements in orange peeling utensils and the primary object of the present invention is to provide an orange peeler having novel and improved features over that disclosed in my U. S. Patent No. 2,528,071, issued October 31, 1950.

An important object of the present invention is to provide an orange peeler including a compound arcuate blade whose outer end is formed with a blade element having a rearwardly extending substantially V-shaped cutting edge which will effectively cut rind or the like in a convenient manner as a concave side surface of the blade rides against the outer surface of a rind.

A further object of the present invention is to provide an orange peeling utensil including a compound arcuate blade having a convexed edge which is provided with arcuated converting side surfaces defining saw teeth for the purpose of sawing through a rind.

A still further aim of the present invention is to provide an orange peeling implement that is extremely simple and practical in construction, strong and reliable in use, efficient and durable in operation, neat and attractive in appearance, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
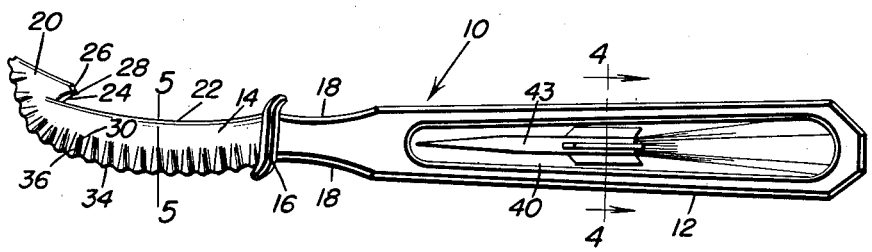
Figure 1 is a top plan view of the present invention.
Figure 2:
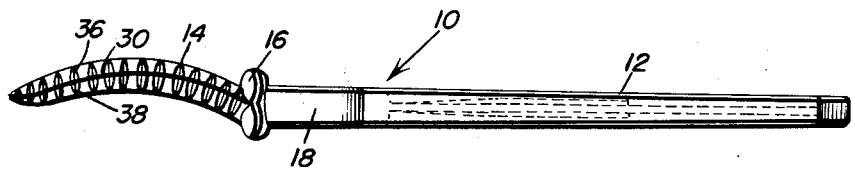
Figure 2 is a side elevational view of Figure 1.
Figure 3:
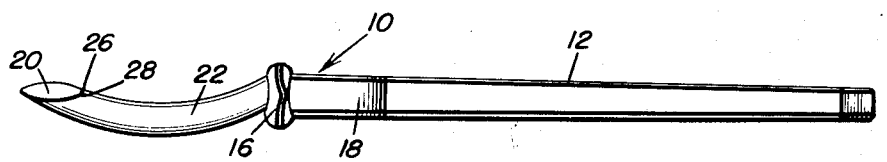
Figure 3 is a side elevational view of the present invention taken from the opposite side of Figure 2.
Figure 4:
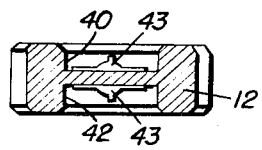
Figure 4 is an enlarged transverse vertical sectional view taken substantially on the plane of section 4—4 Figure 1.

Referring now to the drawings in detail, wherein for the purpose of illustration, there is disclosed a preferred embodiment of the present invention, the numeral 10 represents an orange peeling utensil including a handle 12 having a forwardly extending blade 14 at its forward end. A finger rest 16 is fixed to the handle 12 adjacent to juncture of the handle 12 with the blade 14 and projects beyond the periphery of the handle to restrict sliding movement of a user's hand, gripping the handle, toward the blade 14. Concave recesses 18 and the side surfaces of the handle at the forward end thereof, rearwardly of the rest 16, provide seats for the first finger of a user's hand.

Blade 14 is curved longitudinally of the handle 12 and is also curved sidewardly of the handle 12, whereby blade 14 is a compound arcuate blade. The forward end of blade 14 is integrally formed with an enlarged tapering blade element 20 that projects outwardly from the concave side surface 22 of the blade 14.

Figure 6:
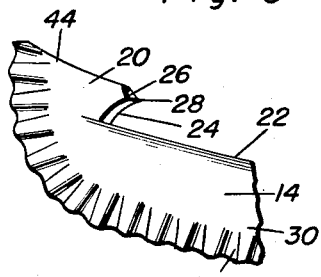
Figure 6 is an enlarged fragmentary view of Figure 1 to illustrate the forward end of the blade and the blade element forming part thereof.

Blade element 20 is provided with a rearwardly extending cutting edge having converging sharp edge portions 24 and 26 that meet at a point 28 which is spaced outwardly from the side surface 22. Edge portion 24 is longer than edge portion 26 and extends from point 28 to side surface 22. Edge portion 24 is also concave to face rearwardly toward handle 12 as shown thus in Figure 6.

Figure 5:
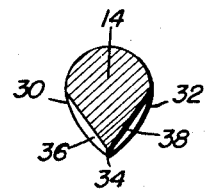
Figure 5 is an enlarged transverse vertical sectional view taken substantially on the plane of section 5—5 of Figure 1.

Blade 14 is provided with substantially inclined upper and lower surfaces 30 and 32 that meet at the convexed side edge 34 of the blade. These surfaces, 30 and 32, are grooved and the material between the grooves are rounded to produce series of saw teeth 36 and 38 (Figure 5) which are capable of sawing or cutting an orange rind.

Handle 12 is provided with elongated recesses 40 and 42 in its upper and lower faces and to the inner walls of these recesses are suitable fixed designs, such as sockets 43, to suggest a modern design of peeler, which is quick to accomplish the result of removing a rind.

Figure 7:
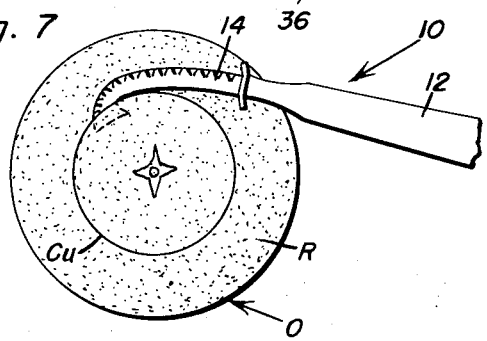
Figure 7 is a diagrammatic view showing the initial step in peeling an orange by using the present utensil.

The practical use of the present invention, the top part of the rind R of the orange O must be cut into a circle with the blade element 20 as shown in Figure 7 using the concave edge 44 of the blade element 20 and the corner or edge portion 26 will prevent damage of the carpel C.

Figure 9:
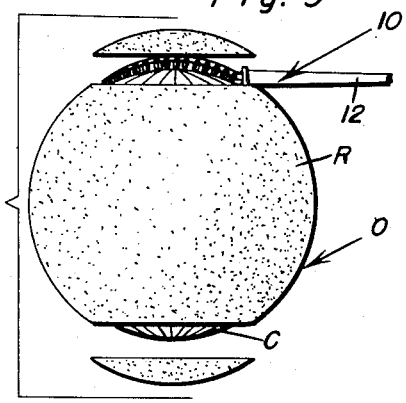
Figure 9 illustrates the third step involved for peeling an orange using the present utensil.
Figure 8:
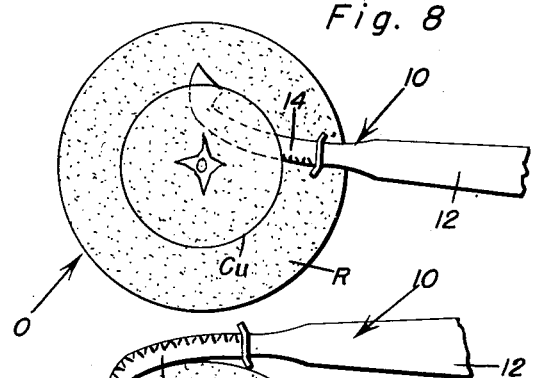
Figure 8 is a diagrammatic view showing the second step in the peeling of an orange by using the present utensil.

Then, the compound arcuate blade is pushed under the circled rind between the rind and the carpel, as shown in Figure 8, and the blade 14 is revolved around the orange top, following the circle cut C until this portion of the rind is completely removed from the whole rind and carpel. The same procedure is followed on the opposite side of the rind as shown in Figure 9 to effect removal of two sections of the rind.

Figure 10:
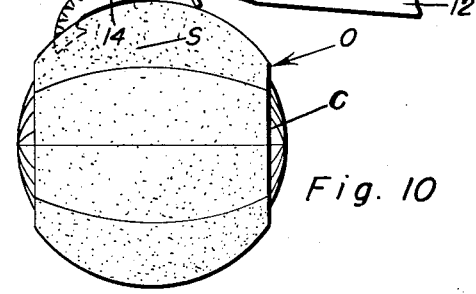
Figure 10 illustrates the fourth step involved in peeling an orange by using the present utensil.

Next, the remainder of the orange rind if sliced into segments of about one inch right around the orange by drawing the blade element 20 from one side to the other as shown in Figure 10.

Figure 11:
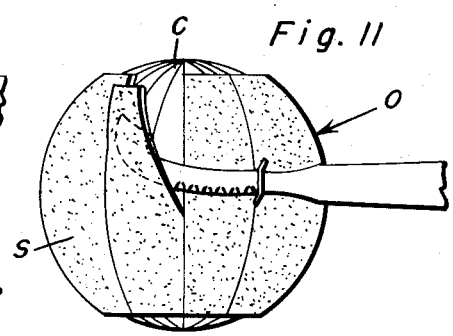
Figure 11 is a diagrammatic view showing the final step involved for peeling the orange by using the present utensil.

Finally, the arcuate blade 14 is pushed under the section between the segment rind and the carpel and the surface 22 of the blade is drawn down onto the adjacent rind section toward the bottom to separate the rind and carpel as shown in Figure 11.

The point 28 of blade element 20 is purposely offset from edge 26 to prevent serious damage to the carpel when cutting rind with rapid movement. The crenulated edge 34, formed by teeth 36 and 38 provides means whereby the bitter white excess left on the carpel from the rind, when the rind is removed, may be scraped off the carpel.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An orange peeling utensil comprising a handle having a blade extending forwardly from one end thereof, said blade being curved both longitudinally of the handle and sidewardly of the handle, said blade having a concave side surface and an enlarged outer end portion projecting outwardly from said side surface, said enlarged end portion having a V-shaped cutting edge whose apex extends rearwardly toward the handle.

2. An orange peeling utensil comprising a handle having a blade extending forwardly from one end thereof, said blade being curved both longitudinally of the handle and sidewardly of the handle, said blade having a concave side surface and an enlarged outer end portion projecting outwardly from said side surface, said enlarged end portion having a V-shaped cutting edge whose apex extends rearwardly toward the handle, said cutting edge including rearwardly converging edge portions meeting at a point spaced from said side surface, one of said edge portions being longer than the other of said edge portions and extending from said point to said side surface.

3. An orange peeling utensil comprising a handle having a blade extending forwardly from one end thereof, said blade being curved both longitudinally of the handle and sidewardly of the handle, said blade having a concave side surface and an enlarged outer end portion projecting outwardly from said side surface, said enlarged end portion having a V-shaped cutting edge whose apex extends rearwardly toward the handle, said cutting edge including rearwardly converging edge portions meeting at a point spaced from said side surface, one of said edge portions being longer than the other of said edge portions and extending from said point to said side surface, said one of said edge portions being concave and facing rearwardly toward said handle.

References Cited in the file of this patent

FOREIGN PATENTS

| Number | Country | Date |
|--------|---------|------|
| 3,850 | Great Britain | of 1904 |